United States Patent Office 2,909,486
Patented Oct. 20, 1959

2,909,486
INHIBITING THE POLYMERIZATION OF NUCLEAR COOLANTS

Eugene L. Colichman, Los Angeles, Calif., assignor, by mesne assignments, to the United States of America as represented by the United States Atomic Energy Commission No Drawing. Application July 13, 1954
Serial No. 443,131

8 Claims. (Cl. 252—74)

The present invention concerns the inhibition or suppression of the polymerization or condensation of the primary dissociation free radical products of the pyrolitic and radiation decomposition of organic nuclear coolants. The invention is directed both to a method of inhibiting the polymerization of a liquid organic nuclear coolant and also to the formulation of a new and novel nuclear reactor coolant.

Various organic compounds have been suggested for use as the primary or secondary coolant in a nuclear reactor. Although the heat exchange characteristics of these coolants are satisfactory, their use has been severely limited due to low pyrolitic and radiation stabilities. Heretofore, no practical solution has been suggested to prevent the simultaneous polymerization of the dissociation products (resulting from pyrolitic and radiolitic decomposition) of a reactor coolant during operation of such reactor. Basically, it has been ascertained that the addition or dispersion of certain metal hydrides in the organic compound will prevent or suppress polymer formation resulting from pyrolitic and radiation decomposition. The metal hydride chosen must decompose or dissociate itself in the operating range of the organic coolant in order to liberate hydrogen gas which prevents or suppresses polymerization.

An object of this invention is to provide a method of inhibiting the polymerization of an organic nuclear reactor.

A further object of this invention is to provide a new and novel nuclear reactor coolant.

A still further object of this invention is to provide a method of inhibiting the decomposition and simultaneous polymerization of a liquid aromatic hydrocarbon subjected to pyrolysis and radiation effects in a nuclear reactor.

An additional object of this invention is to provide an additive to a liquid aromatic hydrocarbon coolant which prevents polymerization or condensation of that coolant.

A further object of this invention is to provide a means to inhibit the polymerization of a nuclear reactor coolant which ordinarily occurs upon the pyrolitic and radiation decomposition of such compounds.

A further object of this invention is to provide an inherent source of hydrogen in a nuclear reactor coolant which prevents polymerization of said coolant due to heat and radiation effects.

Organic coolants used in nuclear reactors are subjected to both pyrolitic and radiation decomposition when such coolant is used in an operating reactor. In order to enhance the operating range and workability of such coolants, it has been desired to prevent or suppress polymer formation resulting from the pyrolitic and radiation decomposition. The present invention provides a source of hydrogen within the coolant which does not detract from the cooling characteristics of the coolant and which inherently provides a source of hydrogen when the organic coolant is in the operating temperature ranges. It is thought that the following action takes place. During operation of the nuclear reactor, a coolant, either primary or secondary, is in close proximity to the source of nuclear radition (alpha, beta, gamma, fast neutron and other particles) which tends to decompose the coolant through pyrolitic and radiolitic action. The pyrolitic and radiation effects cleave the bonds between the basic ring structure and the radicals attached thereto, forming primary dissociation free radical products. Ordinarily, these products will themselves link to each other forming long complex chains and linkages which lead to the polymerization or condensation of these products, forming unwanted polymers or resins in the cooling system. This result must be alleviated in order to give satisfactory coolant operation.

When an organic compound is used as a secondary coolant (i.e., not in a direct heat transfer relation with the reactor core) it will be subjected to high temperatures (400–1000° F.) and gamma radiation. If it were assumed that sodium was the primary coolant the gamma radition could be from $Na^{24}$ decay having an activity of $10^{13}$ to $10^{15}$ disintegrations/sec. cc. When primary coolant usage is contemplated the organic coolant will be subjected to fast neutron fluxes ($1 \times 10^{12}$ to $2 \times 10^{13}$ neutrons/sec. cm.$^2$), thermal neutron fluxes ($5 \times 10^{12}$ to $1 \times 10^{14}$ neutrons/sec. cm.$^2$), and gamma activity ($1 \times 10^{11}$ to $1 \times 10^{13}$ mev./sec. cc.) at temperatures of 400–1000° F. For shield applications the organic coolant will be subjected to small fluxes of fast neutrons and gamma rays.

The dispersal of a powdered metal hydride within the organic compound is believed to act in the following manner. Upon the heating of the organic coolant and the dispersed metal hydride, the metal hydride dissociates into the metal and hydrogen. The hydrogen then preferentially reacts with the primary dissociation free radical products of the organic coolant forming a saturated product and prevents polymerization into complex polymers or resins. In terms of the actual hydrocarbon compounds used, it is believed that when, for example, para-terphenyl dissociates or decomposes due to pyrolitic and/or radiation effects the hydrogen of the metal hydride will preferentially react with the organic free radicals to form, say, biphenyl and/or benzene. This prevents linking of the dissociated free radical terphenyl products with each other to form complex polymers or resins.

The new and novel reactor coolant comprises particular types of organic compounds coupled with particular groups of metal hydrides. It has been determined that the aromatic hydrocarbons should be used as the base material for the coolant due to their stability when subjected to pyrolitic and radiation effects. The applicable hydrocarbons are the polyphenyls and the condensed ring compounds. Specifically, biphenyl, ortho, meta, or para-terphenyl, or the quaterphenyls may be given as examples of the polyphenyls used, while naphthalene, anthracene, and phenanthrene may be given as examples of the condensed ring compounds. The operating range of the above hydrocarbon coolants may generally be given as from 100°–500° C. The above hydrocarbons have melting points which enable them to be in the liquid state in this range. For example, meta-terphenyl melts at approximately 87° C., para-terphenyl melts at 213° C., and p-quaterphenyl melts at a value over 300° C.

It has been found that the metal hydrides best suited for use as additives are found in specific groups in the periodic table. These groups consist of groups IIA and IVA. These particular metal hydrides have the necessary stability and dissociation pressures which allow their use as a dispersant in the above hydrocarbons. It is to be noted that the group IIA hydrides are ionic metal hydrides of the alkaline earth elements in which the density of the hydride is greater than the density of the metal, in which the hydrides are relatively high melting solids, and in which the hydrides react with both moisture and air. The group IVA hydrides are transitional metal hydrides in which the density of the hydride is less than the density of the metal since the hydrogen gas is occluded within the pores of the metal hydrides. These transitional metal hydrides can be heated to high temperatures without melting, decomposing partially into the metal and hydrogen gas, and are unaffected by moisture and air.

The covalent hydrides such as aluminum are not applicable to the instant invention due to their low melting point, their normally high vapor pressure, and their normally liquid or gaseous states. The other metal ionic hydrides such as the alkali metal hydrides (i.e., sodium) are not applicable to the instant invention due to their tendency to pick up large amounts of radioactivity from the nuclear reactor. The other groups of transitional metals are not applicable to the instant invention due to the believed non-existence, as such, of the metal in the hydride form (i.e., iron, cobalt, nickel) and to the extremely high decomposition temperature of the remainder of the transitional metal hydrides.

Specific formulations of coolant may be made using the above hydrocarbons and group IIA metal hydrides such as beryllium, magnesium, or calcium or group IVA metal hydrides such as zirconium or hafnium.

The above metal hydrides may be added to the coolant as an additive in the amounts of from 0.1 to 5%. Any excess of the metal hydride over that necessary to provide enough hydrogen to prevent the polymerization of the hydrocarbon is retained in the hydrocarbon coolant and acts as a "sink" or reserve supply of hydrogen. These percentages of hydride make available a controllable quantity of hydrogen gas. Due to the particular kind of metal hydride and the operating temperatures employed a wide variation of hydrogen pressures may be attained.

The group IVA hydrides, $TiH_2$, $ZrH_2$, and $HfH_2$ decompose into the metal and hydrogen at approximately 400° C., $BeH_2$ decomposes at 125° C., $MgH_2$ decomposes at 280°–300° C., while $CaH_2$ and $BaH_2$ have dissociation pressures of 0.1 and 0.24 atmosphere, respectively, at 600° C. $ZrH_2$ has a dissociation pressure of about one atmosphere at 450° C. and about 0.1–0.2 atmosphere at 400° C.

The selection of a particular metal hydride in the above two groups is primarily a two-fold consideration. First, the metal hydride must have a suitable decomposition temperature and dissociation pressure. Hydrogen gas must be liberated to inhibit the polymerization of the coolant at the temperature which such polymerization would normally occur. Such a decomposition must, of course, take place under 500° C. which is the general upper operating limit of the hydrocarbon coolants.

Secondly, for the majority of nuclear reactor coolant uses, the metal in the hydride must have a relatively low neutron capture cross section. This latter consideration favors the use of zirconium, calcium, beryllium, and magnesium hydrides. In primary coolants a cross section under unity and usually a low fraction thereof should be used. In secondary coolants the metal in the hydride may have a cross section as high as from 1–5. Beryllium and magnesium, for example, have neutron capture cross sections of 0.010 and 0.059 barn, respectively, and are suitable for use as either primary or secondary coolants. Further considerations in practicing the present method and formulating the instant coolant include (1) the ease of dispersal of the powdered metal hydride in the hydrocarbon coolant due to the density and particle size of the metal hydride and (2) that the metal hydrides do not attack the hydrocarbon coolant and are not soluble therein.

The following is given as an example of practicing both the method of inhibiting the polymerization of the hydrocarbon coolants as well as the formulation of a particularly new and novel organic nuclear reactor coolant. Approximately 3% zirconium hydride is added to para-terphenyl (97%) and such coolant with the zirconium hydride dispersed therein is circulated within the nuclear reactor cooling system. This mixture is subjected to irradition from within the nuclear reactor. This method and this particular formulation will operate in the 300°–500° range due to the melting temperature of para-terphenyl at 213° C. and the dissociation pressure of zirconium hydride. It can be seen in this combination that some polymerization of the para-terphenyl will take place prior to the liberation of the hydrogen from the hydride. However, the subsequent rise in temperature of the coolant and the effect of the radiation from the nuclear reactor in cleaving the linkages between the various rings of the hydrocarbon tend to prevent further polymerization or condensation into complex polymers and resins. The mechanism of hydrogen liberation by the zirconium hydrides and the linking of the hydrogen to the decomposed hydrocarbon thus prevents polymerization or condensation of the primary dissociated free radical products. The hydrogen, it is believed, tends to preferentially link with the cleaved ring-type hydrocarbon free radical products forming again the saturated primary starting products (i.e., the terphenyls, biphenyl) rather than long-linked chain polymers or resins.

Although the invention has been described in detail, it is to be clearly understood that the same is by way of example only and is not to be taken by way of limitation, the spirit and scope of this invention being limited only by the terms of the appended claims.

I claim:

1. A nuclear reactor coolant consisting essentially of a liquid aromatic hydrocarbon, selected from the group consisting of polyphenyls and condensed ring compounds having from 2 to about 4 carbon rings, and from 0.1 to 5% of a powdered metal hydride, chosen from the group consisting of the group IIA and IVA metal hydrides, dispersed in said hydrocarbon.

2. The composition of claim 1 in which the metal hydride is zirconium hydride.

3. The composition of claim 1 in which the metal hydride is beryllium hydride.

4. The composition set out in claim 1 in which the metal hydride is magnesium hydride.

5. The composition set out in claim 1 in which the metal hydride is calcium hydride.

6. The composition of claim 1 in which the hydrocarbon is a terphenyl and the metal hydride is of low neutron capture cross section.

7. A nuclear reactor coolant consisting essentially of polyphenyls having from 2 to about 4 phenyl rings, and from 0.1 to 5 percent of a powdered metal hydride, selected from the class consisting of the groups IIA and IVA metal hydrides, dispersed in said polyphenyls.

8. A nuclear reactor coolant consisting essentially of terphenyl, and from 0.1 to 5 percent of zirconium hydride dispersed in said terphenyl.

References Cited in the file of this patent

UNITED STATES PATENTS

| | | |
|---|---|---|
| 2,013,152 | Hoyt | Sept. 3, 1935 |
| 2,029,748 | Weber | Feb. 4, 1936 |
| 2,461,797 | Zwicky | Feb. 15, 1949 |
| 2,573,471 | Malina et al. | Oct. 30, 1951 |
| 2,642,345 | Bradley et al. | June 16, 1953 |
| 2,743,223 | McClinton et al. | Apr. 24, 1956 |

FOREIGN PATENTS

| | | |
|---|---|---|
| 697,601 | Great Britain | Sept. 23, 1953 |

OTHER REFERENCES

Chem. Rev. 31 (1942), an article by H. I. Schlesinger and A. B. Burg, page 37.

An Introduction to the Chemistry of the Hydrides, D. T. Hurd, John Wiley & Sons, N.Y. (1952), pages 30, 34, 162, 163.